(12) United States Patent
Ivashin (10) Patent No.: US 8,440,955 B2
(45) Date of Patent: May 14, 2013

(54) METHOD FOR SPATIAL SMOOTHING IN A SHADER PIPELINE FOR A MULTI-PROJECTOR DISPLAY

(75) Inventor: Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 13/019,479

(22) Filed: Feb. 2, 2011

(65) Prior Publication Data

US 2012/0194562 A1    Aug. 2, 2012

(51) Int. Cl.
*H01L 27/00* (2006.01)
*H04N 17/00* (2006.01)
*H04N 5/66* (2006.01)
*G03B 21/14* (2006.01)
*G03B 21/26* (2006.01)

(52) U.S. Cl.
USPC .......... 250/208.1; 348/189; 348/383; 353/48; 353/94

(58) Field of Classification Search ............... 250/208.1; 348/189, 383; 382/164, 171, 173, 174; 345/426, 345/581, 611, 613, 614; 353/48, 89, 94
See application file for complete search history.

(56) References Cited

U.S. PATENT DOCUMENTS 7,444,019 B2 * 10/2008 Boykov et al. ................ 382/173

* cited by examiner

*Primary Examiner* — Que T Le
*Assistant Examiner* — Don Williams (57) ABSTRACT

A device, computer-readable medium or method for adjusting pixels of a source image prior to being output to a display device comprising: segmenting the pixels of the source image into spatial groups; assigning an adjustment method to each pixel in a group; creating an adjustment matrix set with rows (or columns) corresponding to the plurality of adjustment methods, and columns (or rows) corresponding to a range of pixel values that exceed a discrete output device value, and adjustment values as entries; receiving a pixel of the source image in a graphics processing unit (GPU) and using the GPU to: determine the pixel's relative location in its spatial group and its corresponding adjustment method; determine the range of pixel values that the value of the pixel exceeds a discrete output device value: select an adjustment value from the adjustment matrix set; and adjust the value of the pixel by the adjustment value.

20 Claims, 10 Drawing Sheets

```
uniform float displayPixelWidth;   // Integer Units
uniform float displayPixelHeight;  // Integer Units int  GetSpatialIndex (in vec2 position) {
    // Remove the 1/2 texel offset in the position coordinate (0.5)
    float pixelPosX = position.x * displayPixelWidth  - 0.5;
    float pixelPosY = position.y * displayPixelHeight - 0.5;
    // Compute A,B,C,D adjustment table row index from odd/even column/row
pixel position
    float X = abs(fract(pixelPosX /2.)); // >= 0.5 if odd column
    float Y = abs(fract(pixelPosY /2.)); // >= 0.5 if odd row
    int index = int(floor(X+0.5) + 2.*floor(Y+0.5)); // 0, 1, 2, 3 for A, B,
C, D
    return index;
} void AdjustValue (in mat4 ABCD, in int index, inout float value) {
    value = value + ABCD [index][int(floor(4.*fract(value*255.0)))];
} vec3 SpatialPixelAdjust (in mat4 ABCD, in vec2 position, in vec3 color) {
    int index = GetSpatialIndex (position);

vec3 colorOut = clamp (color, 0.0, 1.0);
    AdjustValue (ABCD, index, colorOut.r);
    AdjustValue (ABCD, index, colorOut.g);
    AdjustValue (ABCD, index, colorOut.b);
    colorOut = clamp (colorOut, 0.0, 1.0);
    return colorOut;
} vec3 GetAdjustForQRound (in vec2 position, in vec3 color) {
    //               [0.00,0.25) [0.25,0.50) [0.50,0.75) [0.75,1.00)
    mat4 ABCD = mat4( 0.00/255.0, 0.25/255.0, 0.00/255.0, 0.00/255.0,   // A
                      0.00/255.0, 0.00/255.0,-0.50/255.0, 0.00/255.0,   // B
                      0.00/255.0, 0.00/255.0,-0.50/255.0,-0.75/255.0,   // C
                      0.00/255.0, 0.00/255.0, 0.00/255.0, 0.00/255.0 ); // D
    return SpatialPixelAdjust (ABCD, position, color);
} vec3 GetAdjustForQTrunc (in vec2 position, in vec3 color) {
    //               [0.00,0.25) [0.25,0.50) [0.50,0.75) [0.75,1.00)
    mat4 ABCD = mat4( 0.00/255.0, 0.75/255.0, 0.50/255.0, 0.25/255.0,   //
A'
                      0.00/255.0, 0.00/255.0, 0.00/255.0, 0.25/255.0,   //
B'
                      0.00/255.0, 0.00/255.0, 0.00/255.0, 0.00/255.0,   //
C'
                      0.00/255.0, 0.00/255.0, 0.50/255.0, 0.25/255.0 ); //
D'
    return SpatialPixelAdjust (ABCD, position, color);
}
```

METHOD FOR SPATIAL SMOOTHING IN A SHADER PIPELINE FOR A MULTI-PROJECTOR DISPLAY

CROSS-REFERENCE TO RELATED APPLICATION(S)

This application is related to commonly owned U.S. patent application Ser. No. 12/501,162, filed Jul. 10, 2009, and U.S. patent application Ser. No. 12/730,470 filed Mar. 24, 2010, which are hereby incorporated by reference in their entirety.

BACKGROUND

The present invention is related to a multiple projector system. In this system multiple projectors are controlled and coordinated to provide a large display region such as a wall display. In such a display the goal is to provide a seamless image. However, in certain areas there is an overlap region where two projectors contribute light output to the same portion of the display surface. Unfortunately the combination from two projectors in this overlap region is additive and results in a brighter region with color differences. The overlap region is thus a visible band in the overall displayed image.

In order to minimize the visual band that occurs from the overlap region, a number of techniques have been proposed to "blend" the image to reduce the visual differences from one region to another. A simple blending method would output pixels in the overlapping edge regions of projector A and B at only 50% of their source brightness. Or, similarly, another simple method would have the pixels in the overlapping edge region of projector A be set to black (0% brightness) and pixels from overlapping edge region of projector B be left unchanged. Either method might conclude that the additive output will equate with 100% source brightness on the display surface.

However, this assumption incorrectly simplifies conditions that exist with actual projectors. With such an approach, boundaries between non-overlapped and overlapped regions (at the edges) require perfect alignment or results are visible as bright seams or gaps. Also, the extra light output by a single projector, even if emitting black, can affect the color blending enough to notice the edge boundaries. Device light output levels are seldom identical and so the 50%/50% approach cannot ensure success. Better blending is required to smoothly transition among non-overlapping and overlapping regions.

One better technique is to gradually reduce the output brightness for each projector pixel in the overlapping region in a reciprocal fashion. The brightness level of one projector gradual diminishes while the brightness of the other increases across the overlapping region. Each individual projector therefore contributes maximum brightness at its inside edge, equivalent to the non-overlapping regions nearest said edge, and contributes minimum brightness at its outside edge, furthest overlapped into the opposite projector at the boundary to the opposite projector's non-overlapped region. For example, pixels at the inside edges of the overlapping region are output at 100% brightness, while pixels at the outside edges are output at 0% brightness. This ensures that at any point between the edges, exactly 100% brightness will be achieved through a combination of the brightness of projector A plus the brightness of projector B. Since each logical pixel in the overlap region has some brightness value from either projector A or B, and no logical pixel contributes more than 100% brightness, there should be no seams or gaps.

Again, in actual practice, this better but still simple technique results in some visual bands or gaps in the image. Thus, in practice, the projectors are further adjusted using different blending formulas until the overall image looks fairly uniform. The terms "function," formula," and "algorithm" are used interchangeably herein to describe any method that blends or smoothes the overlap region formed between two projected images. As will be appreciated, there are an infinite number of blending formulas that can be used. But, there was no method available to determine the best formula for a particular situation, i.e., a particular set of projectors. Commonly owned U.S. patent application Ser. No. 12/501,162, filed Jul. 10, 2009, which is hereby incorporated by reference in its entirety, addressed the problem of determining the best formula for a particular situation. Commonly owned U.S. patent application Ser. No. 12/730,470 filed Mar. 24, 2010, which is hereby incorporated by reference in its entirety, addressed the problem creating blending ramps for complex projector image overlaps.

Digital display devices, such as LCD projectors, can generate a finite range of output colors. Commonly used is an RGB color model having 24-bits per pixel, composed of three color channels: red, green, and blue. This provides up to 256 color intensity levels for each 8-bit color channel, or 16,777,216 combined colors.

The multi-projector display system places high demands on this color range in the output projectors. Digital processes of all kinds stretch, compress, reshape, or otherwise manipulate source content and continually challenge color accuracy. To produce seamless large field displays in the best possible quality, a high bit depth is desirable.

The blending functions described in the above-referenced commonly owned patent applications, for example, operate on pixels in overlapping projector regions. However, even with so many color output choices, blending regions can experience trouble with producing smooth, visually continuous gradients of changing luminance. When a count of pixels in a blending region is greater than the range of available color values, the continuous gradient can appear as a series of discrete stair-steps. This banding, unwanted posterization (also solarization, false contouring effects), can even produce a Mach band optical illusion in which each band appears to have a light or dark region in a direction opposing the overall gradient. Some of these problems can be reduced by dithering or increasing bit depth.

Increasing the luminance in some display regions by electronically adding color values to more closely approximate brighter regions where projectors' displays overlap with one another is a method used by black level compensation. Better quality can usually be achieved when there are numerous low-luminance color values choices available. Projectors with very low black points are often more difficult to adjust as the range of color choices at such low luminance is small.

Blending, black level compensation, and many more requirements in a multi-projector display system quickly make use of the entire available color range.

SUMMARY OF INVENTION

With advanced graphics processing units (GPUs) becoming ever more ubiquitous in systems that connect with display devices, many technologies can be implemented in real-time and without custom hardware by using GPU shaders. A shader is a software program implemented using instructions defined by various interfaces such as OpenGL, providing a shading language called GLSL, or Microsoft Direct3D APIs high level shading language, HLSL that execute within the display pipeline of a GPU.

GPU shaders are used for several key operations in the multi-projector display system. The present invention is directed to a shader method and apparatus that provides better control over an output projector by the GPU using a color result from the multitude of other multi-projector shader processing steps. The process achieves a more visually acceptable color perception on a multi-projector display screen. The effect provides expanded visual color intensities that can better smooth coarse steps in a typical color range.

More specifically, the present invention is a device, computer-readable medium or method for adjusting pixels of a source image prior to being output to a display device comprising: segmenting the pixels of the source image into spatial groups; assigning an adjustment method to each pixel in a group; creating an adjustment matrix set with rows (or columns) corresponding to the plurality of adjustment methods, and columns (or rows) corresponding to a range of pixel values that exceed a discrete output device value, and adjustment values as entries; receiving a pixel of the source image in a graphics processing unit (GPU) and using the GPU to: determine the pixel's relative location in its spatial group and its corresponding adjustment method; determine the range of pixel values that the value of the pixel exceeds a discrete output device value: select an adjustment value from the adjustment matrix set; and adjust the value of the pixel by the adjustment value.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 13 shows example code for OpenGL fragment shader spatial adjustment functions of the present invention.

DESCRIPTION OF THE PREFERRED EMBODIMENTS

Figure 1:
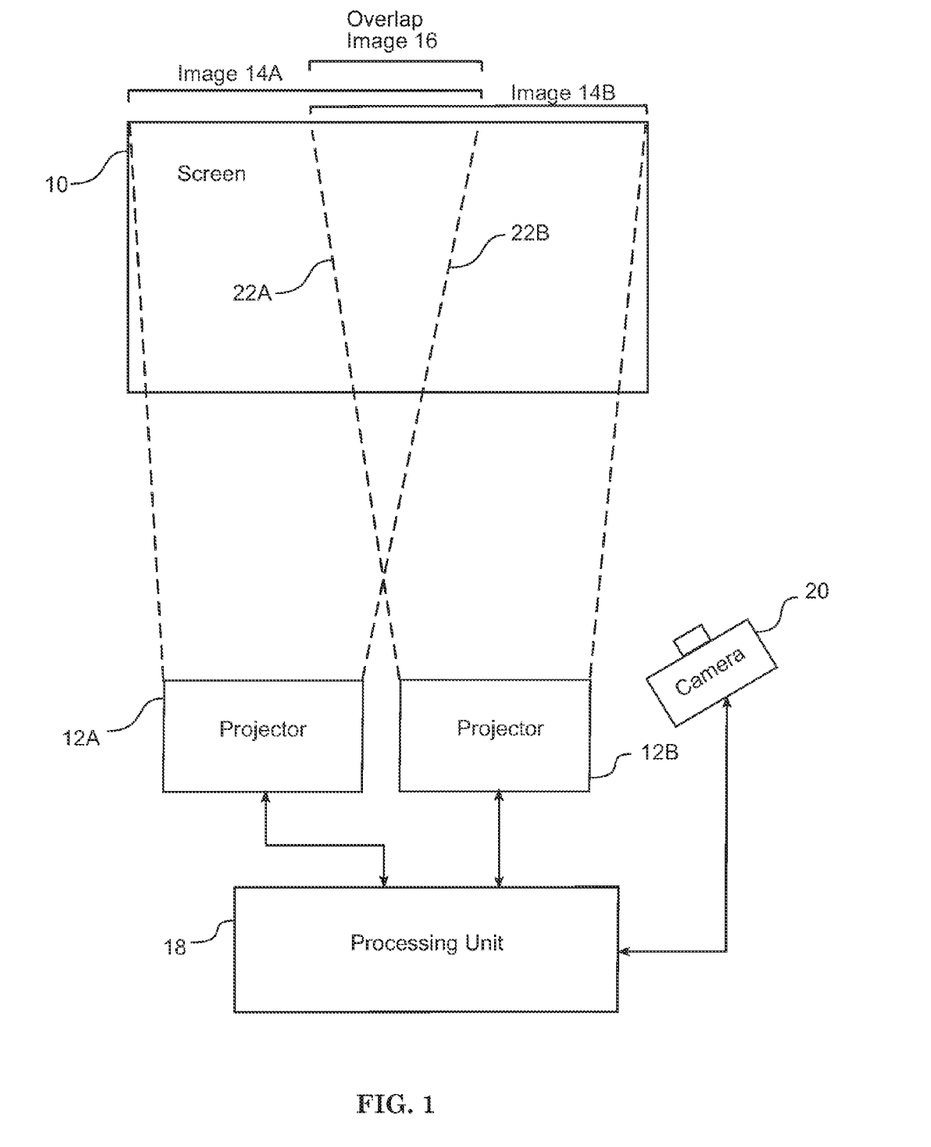
FIG. 1 is a general block diagram of the system of the present invention.

FIG. 1 shows a general system block diagram of the environment of the present invention. In this system, multiple projectors are controlled and coordinated to provide a large display region such as a wall display. In FIG. 1, just two projectors are illustrated for simplicity; however, in a large system three, four, or more projectors may be utilized. Eight projectors are used in an exemplary 2×4 configuration. As shown, projectors 12A and 12B each project an image onto a portion of the screen 10, with image 14A occupying one portion, image 14B occupying a second portion, and overlap image 16 occupying a portion that represents the intersection of images 14A and 14B projected onto screen 10. Using multiple projectors in this manner with overlapping and complementary projections can be used to provide a very large, but still very bright and clear, continuous display.

Various approaches are available to build the multi-projector display of FIG. 1. It is well known that in order to project what appears to be a single continuous image, a camera (or cameras) is used to determine the display surface and each individual projector's intrinsic and extrinsic parameters all in a common coordinate frame. This enables multiple projectors to generate a rectangular image of known aspect ratio even though the projectors themselves are aimed at an arbitrarily inclined planar surface. One approach is to use a camera 20 that has been calibrated by viewing a regularly spaced grid placed on the screen 10, and then registering subsequent images from projectors 12A and 12B to the grid. Another approach is, for each projector, project a structured pattern (e.g. checkerboard), extract features from the pattern and find the camera-projector pixel correspondence, and compute the homography between the projector and camera. The present invention is not concerned with, or confined by, any particular method or algorithm for identifying the homography between the projectors and the camera(s).

Projectors 12A and 12B are preferably of the liquid crystal display (LCD) type, digital light processing (DLP) type, liquid crystal on silicon (LCOS) type, or other digital projection technology type. Projectors 12A and 12B are controlled by processing unit 18 to project their respective images 14A and 14B onto screen 10. The processing unit can be a personal computer (PC), a dedicated processor, a server, or any type of computer processing device. Camera 20 is preferably a digital camera having an image sensor including a camera sensor pixel array. Although only one camera is shown in FIG. 1, a plurality of cameras may be used to obtain multiple projection views, As mentioned in the background of this invention, the overlap image 16 is formed by both projectors 12A and 12B, each contributing light to the same portion of the display surface of screen 10. The combination from two projectors in this overlap region is additive and can result in an overlap image 16 that is brighter than images 14A and 14B with noticeable color differences. The overlap image 16 can be a visible band in the overall displayed image.

Figure 2:
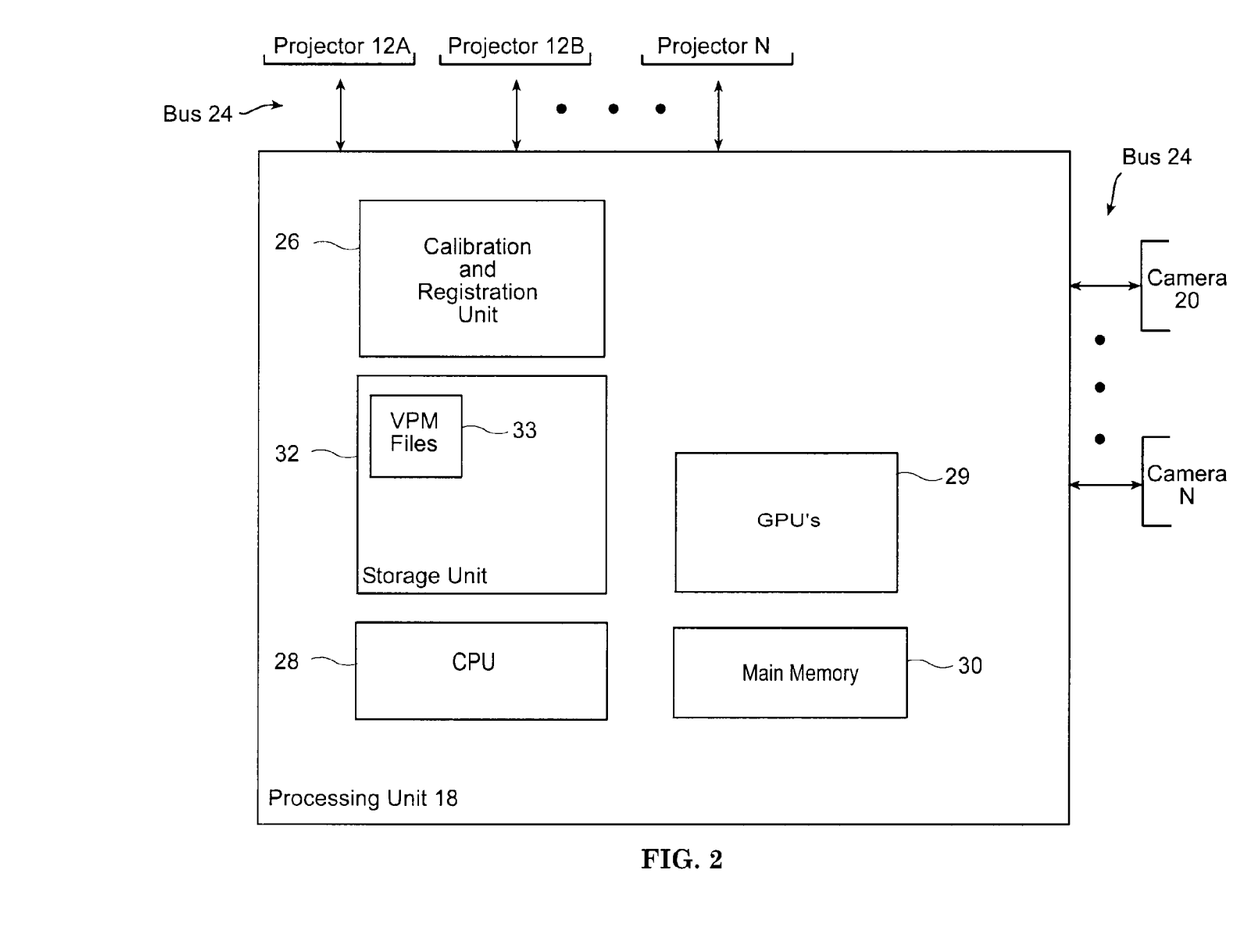
FIG. 2 is a general block diagram of the processing unit of the present invention.

FIG. 2 illustrates processing unit 18 in greater detail. Processing unit 18 interfaces with projectors 12A and 12B (shown in FIG. 1) and can further interface with a number of additional projectors up to projector N. Processing unit 18 also interfaces with camera 20 and can further interface with a number of additional cameras up to camera N. Communication between processing unit 18 and projectors/cameras is via bidirectional bus lines or via a common interface bus. These bus lines (or bus) are shown generally as bus 24 in FIG. 2.

Processing unit 18 may be implemented as a personal computer (PC) and will include various components, as is well known in the art. These will include, for example, a central processing unit (CPU) 28 and a main memory 30, which could include a hard drive, RAM, ROM, CD, etc. Main memory as used herein is all memory that can store, for example, the operating system, application programs, display software, etc. Processing unit 18 may also include one or more graphics processing units 29 (GPUs) to control the projectors. The GPUs allow for much faster processing of the displayed images, and are especially useful for displaying moving images. Processing unit 18, using CPU 28, GPUs 29, and other typical hardware/firmware and the software stored in main memory 30 will control projectors 12A and 12B to project images onto screen 10. Internal busses and connections within the processing unit are omitted for clarity; but, as is well known, one or more busses and/or signal lines connect the various internal units to each other and to external devices such as the projectors and camera.

As discussed above, in order to project what appears to be a single continuous image, each individual projector's intrinsic and extrinsic parameters must all be in a common coordinate frame. This enables multiple projectors to generate a rectangular image of known aspect ratio. Processing unit 18 includes a calibration and registration unit 26 that creates an accurate pixel registration map of each projector. Each physical device pixel on a projector can be mapped to one or more logical pixels in a virtual region defining the large format display (composite image). This virtual region will be referred to herein as a virtual pixel map (VPM). This virtual large format display resolution defines the unit of each VPM pixel, which is a virtual pixel in the logical display region. It also defines the location of VPM pixels on one device relative to VPM pixels on another. The bounded display region represents a homogenous portion of the logical display region within which every pixel is addressable by at least one physical device pixel. As mentioned above, there are numerous methods for creating a virtual pixel map such as grid or structured pattern registration but the present invention is not concerned with or confined by any particular method or algorithm for identifying the homography between the projectors and the camera(s). The processing unit 18 will refer to the virtual pixel map, which may be contained in calibration and registration unit 26, when controlling the projectors to project an image.

Figure 3:
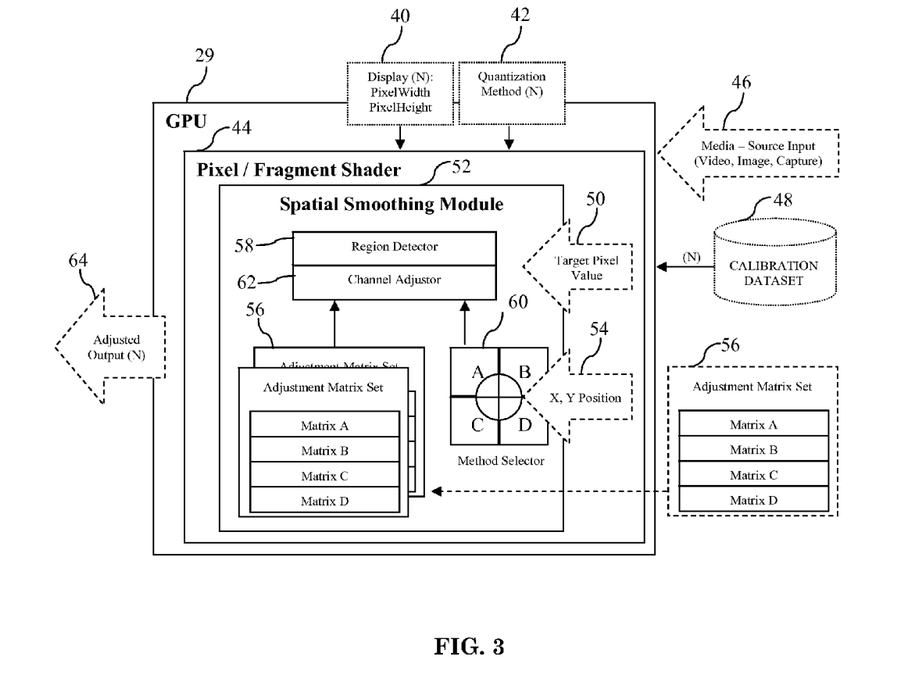
FIG. 3 shows the spatial smoothing module of the present invention executing within the shader pipeline inside a graphics processing unit (GPU)

As discussed above, processing unit 18 may also include one or more graphics processing units 29 (GPUs) to control the projectors. FIG. 3 illustrates an exemplary GPU 29, with particular emphasis on the shader pipeline. For each of projectors 12A, 12B to N, its characteristics 40, e.g. display pixel width, pixel height, and quantization method 42, are input to pixel/fragment shader 44. The media source 46, e.g. video, stored image, or camera captured image, is input to GPU 29 as well as the calibration dataset 48 for a particular projector N. The calibration dataset 48 may be comprised of the virtual pixel map and ramping/blending functions mentioned above. Based on the projector characteristics, quantization adjustment, calibration and ramping/blending functions, an original pixel value representing the source input is modified by the pixel/fragment shader 44 to a target pixel value 50. The target pixel value 50 is then further modified and output by GPU 29 as a collection of adjusted output pixels in adjusted output 64. Pixels of adjusted output 64, when projected on a screen 10 in the multi-projector system of FIG. 1, will appear properly as part of a wide-screen homogenous display.

The present invention includes spatial smoothing module 52 that is utilized in the multi-projector display system to provide a spatial smoothing function in the shader pipeline. The spatial smoothing module 52 modifies a target pixel value 50 in pixel/fragment shader 44 such that visual representation of a local grouping of modified target pixels output by GPU 29 more closely approximates similar value target pixels in the local grouping prior to its modification. Further, the present invention provides an increased visual precision to pixel value selection that allows a broader choice for continuous tonal regions, such as with a setting for a black level compensation.

In order to understand how the present invention modifies or adjusts target pixels in the spatial smoothing module 52, first we will discuss the operation of the pixel/fragment shader 44.

Shaders execute on GPU (graphics processing unit) 29. As shown in FIG. 2, GPU 29 forms part of processing unit 18 that controls projector 12A, 12B, etc. connected by bus 24. A pixel shader, or fragment shader in OpenGL, is enabled at an appropriate stage in the processing pipeline when a target pixel value is ready for adjustment.

Pixel values in a shader, including a target pixel value, represent a color with a set of floating point numbers, each number identifying a channel value component of an output pixel. Channel values are normalized in a range between 0.00 and 1.00, from a minimum intensity level to a maximum intensity level. For example, three floating point numbers are used for an RGB pixel value to store the values for the red, green, and blue primary color channels.

Figure 4:
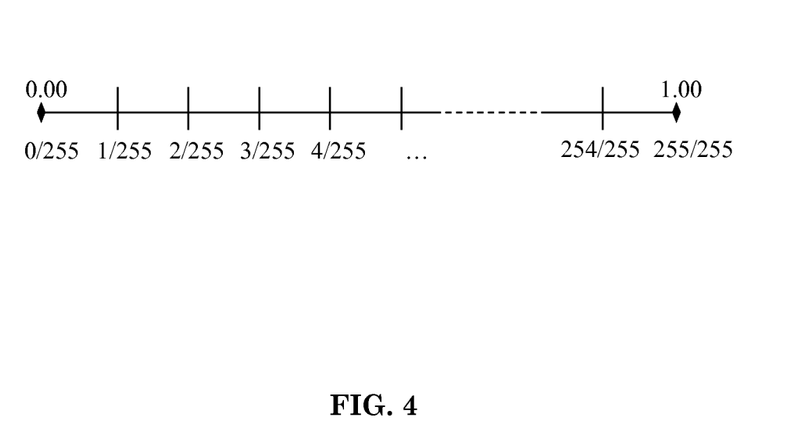
FIG. 4 illustrates the normalized values in an 8-bit color channel.

When using a display configured for 24-bit RGB output, pixels are composed of three 8-bit primary color channels. This provides 256 discrete color values for each channel. FIG. 4 illustrates how 8-bit channel values are normalized within a floating point range for use in a GPU shader. Nearly all input to some shaders, including image content stored in textures, undergoes floating point conversion or similar normalization.

As part of the GPU rasterization process, a shader is responsible for computing a single target pixel value for a requested location (X, Y) on the display device. The computation of a target pixel value may involve many operations. For example, in the multi-projector display system discussed above a Virtual Pixel Map (VPM) is established through a calibration process. The Virtual Pixel Map associates projector device pixels with one or more source content pixels. Thus, one function of the pixel/fragment shader 44 is to combine all contributing source content pixels associated with a specified projector device pixel according to a Virtual Pixel Map. The combined pixel value may be further manipulated by the shader according to color calibration data, blending operations, and black level compensation. After completion of all necessary operations, the resulting computed pixel value is called a target pixel value 50.

When the target pixel value 50 is output by the pixel shader process (i.e. gl_FragColor), the GPU output pipeline proceeds and eventually sends the result, adjusted output 64, to a display device input for processing (i.e. the projector 12A outputs the incoming signal on the display screen 10). Within this output pipeline and projector, internal floating point representations of target pixel channel values are converted back into a form previously configured or supported by a target device signaling. This generally involves a quantization step which may truncate or round the target pixel value to meet appropriate device capabilities or bit depth. Adjusted output 64 represents the collection of these modified target pixel values which are output on the device.

For example, a projector 12A and GPU 29 are configured to exchange 24-bit RGB pixel data. A target pixel value output by the pixel/fragment shader 44 will thus be converted by the GPU 29 from the normalized floating point continuous representations to the one of 16,777,216 possible output colors (or 256 discrete color values per each of three primary color channels). Since a target pixel value is a computed entity, it can be expected that some values will not convert directly to the discrete set of values supported by the bit-depth of the output requirement.

One aspect of this invention is to modify the target pixel value in the pixel/fragment shader 44 prior to output and according to the associated and requested pixel location (i.e. target pixel position) such that a visual perception of the adjusted output color after the quantization/conversion more closely approximates the target pixel value which otherwise could not be realized by the limited output bit depth. Specifically, the rounding or truncation method of a fixed quantization step is exploited such that the error of output conversion is spatially managed within a localized region of neighboring pixels. The present invention allows groups of pixel values at risk for quantization error to have improved output accuracy through error redistribution while maintaining high frequency response among pixels groups not subject to the quantization risk. The details of this process are described in the following sections.

The present invention does not reduce overall image resolution to support all target pixel values by a global dither characteristic. The effect here is more subtle. The present invention can expand a visual precision in regions of large tonal continuity, as those found with black level compensation values, contiguous solid color regions, or gradient based blending ramps. It does so by adding small localized pixel adjustments where computation precision is best preserved. These adjustments can be considered "noise" or redistributed error. However, channel adjustments are small such that they do not deviate more than a single intensity value from pre-adjusted channel values.

The following is a discussion about quantization methods for device output.

Constraining a continuous set (a larger range) of values to a more discrete set (a smaller range) of values involves quantization. A set of real numbers, for example, could be constrained to a set of only integer numbers. Similar to lossy compression, quantization involves replacing a range of values with a single quantum value. A process of quantization through sampling a signal or a numeric range is one attempt at approximating the larger range of values with a smaller set of discrete values. Common numeric operations performing quantization include truncation and rounding.

Figure 5:
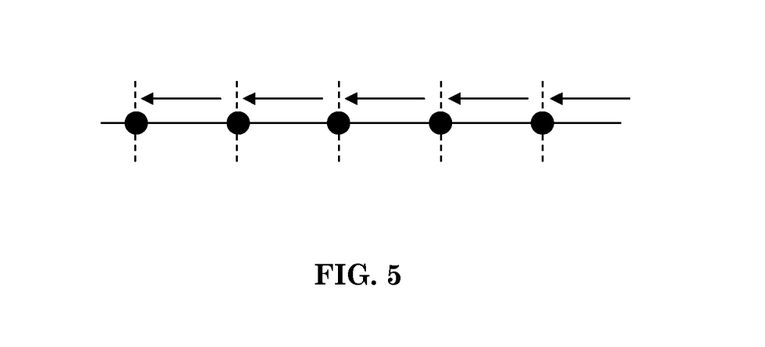
FIG. 5 illustrates value truncation at fixed intervals.

Fixed-point numeric quantization, or uniform quantization, involves choosing discrete values, points, at determined fixed intervals among a continuous range of possible values. With truncation, as shown in FIG. 5, values within the interval between two points are assigned to the next lower point. Truncation is easy to implement but also can exhibit large quantization error since a given continuous value may be replaced by a quantum value nearly a full fixed interval difference away. Truncation is also biased so average quantization error may have a non-zero mean.

Figure 6:
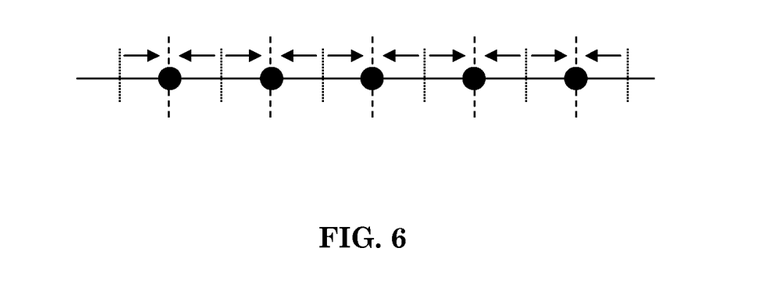
FIG. 6 illustrates value rounding at fixed intervals.

With rounding, as shown in FIG. 6, values within the interval between two points are assigned to the nearest point. Quantization error is better balanced and can be half that of a truncation method. Points are effectively centered within an interval size quantization error region.

Figure 7:
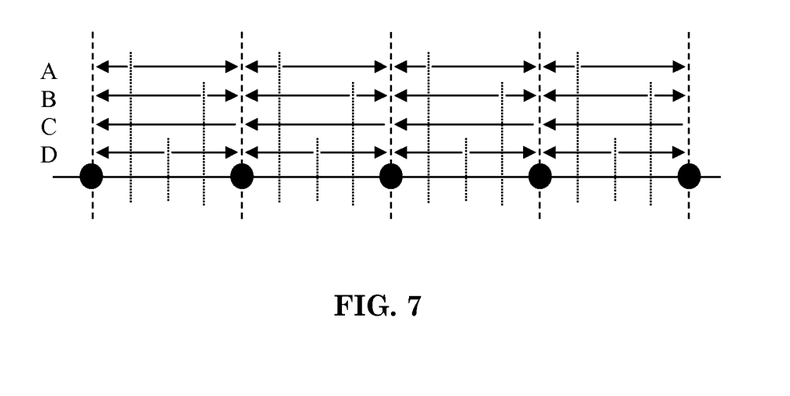
FIG. 7 illustrates a set of quantization methods.

The present invention utilizes four quantization methods shown together in FIG. 7, and labeled A, B, C, and D. Method A states that the interval between two points be segmented by a 25%:75% relationship. Values within the first 25% of the interval are assigned to the next lower point. Values within the remaining 75% of the interval are assigned to the next higher point. Method B states an opposite 75%:25% relationship. Values within the first 75% are assigned to the next lower point and the remaining 25% are assigned to the next higher point. Method C follows the rules of truncation, as values within 100% of the interval are assigned to the next lower point. Method D follows the rules of rounding by using a 50%:50% interval segmentation relationship.

Rounding is the most common method used by a GPU and projector for converting an internal floating point representation of a pixel channel value to a discrete channel value with a target device bit depth. The uniform quantization sampling over the continuous range of channel values produces error in output representation.

Figure 8:
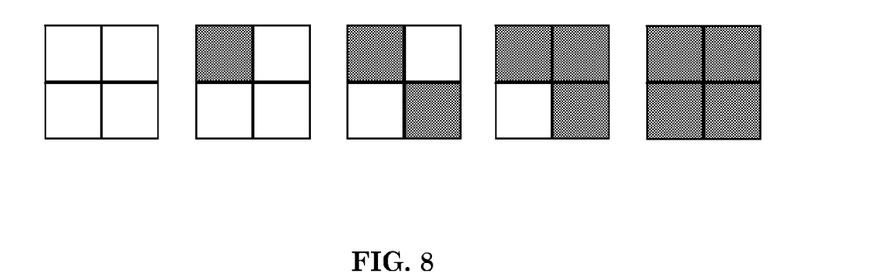
FIG. 8 illustrates groups of four display pixels.

The human visual system integrates information over spatial regions. Alternating lighter and darker regions evokes perception of a middle average region even when the individual elements can be resolved. Thus, dividing the display into groups of four pixels provides a small region within which visual smoothing can be performed. FIG. 8 shows some pixel groups and their spatial relationship with example values. Note the square formation which ensures pixels in each group are located visually near one another.

In this example, each square in a group is a device pixel having a single color component. The white squares indicate pixels with a channel value V corresponding directly to a target output luminance (i.e. value 128, for example, in an 8-bit per channel display device). The leftmost pixel group has value V at all four pixel locations. The gray squares indicate pixels with channel value V+1, which also corresponds to a next target output luminance (i.e. value 129, in this example). The rightmost pixel group has value V+1 at all four pixel locations. Though output values between V and V+1 are not directly "addressable" by the display device, the middle three pixel groups in FIG. 8 attempt to visually simulate some "between" values using a percentage of visual area within the pixel group. Reading from left to right and using the example values, the first pixel group has 100% area occupied by value 128, the second group has 75% area at value 128 and 25% area at value 129, the third group area is covered with 50% value 128 and 50% value 129, the fourth group has 25% area at value 128 and 75% area at value 129, and the last group has 100% area occupied by value 129.

Figure 9:
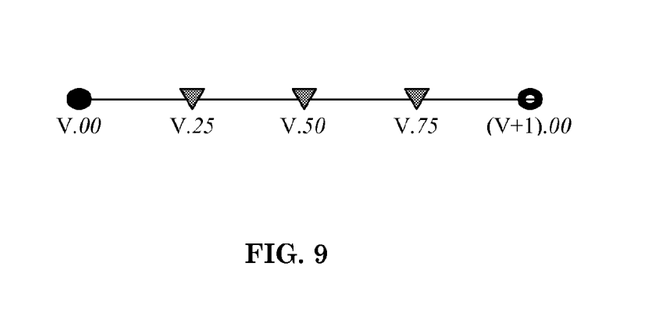
FIG. 9 illustrates division of a range from value V up to but not including a next value V+1:[V,V+1)

Unless the individual display pixels are quite large as seen from the observed position, the human eye will not perceive the individual pixel values occupying these spatial manipulations and instead fuse the two used pixel values across the four pixel locations according to the area relationship. The result is an apparent visual perception of values 128, 128.25, 128.50, 128.75, and 129. FIG. 9 shows that a continuous range of values between V and V+1 can be divided equally, and that the fractional component of this division indicates a percentage of a next higher value required to display the intended value. Note that spatial division need not be limited to a 2×2 square area or range division be evenly divided.

The impact of this spatial exercise, however, is that a physical display resolution is exchanged for a reduced logical display resolution composed of physical display pixel groups with an increased "bit depth". Using a reduced logical display resolution at all times to achieve this capability might not always be desirable or necessary. Often source content pixel values are already near an integral unit in the display output range or channel bit depth and do not require such techniques. Thus, the smoothing method of the present invention adjusts individual pixels according to a spatial location and individual channel values but without inspection of surrounding pixel values or a constant reduction in display resolution. This preserves high frequency source content (as when all pixels in a pixel group are different) while achieving a similar smoothing effect as described above when source content across the spatial frequency is contiguous or similar in tone (as when all pixels in a group are the same).

Figure 10:
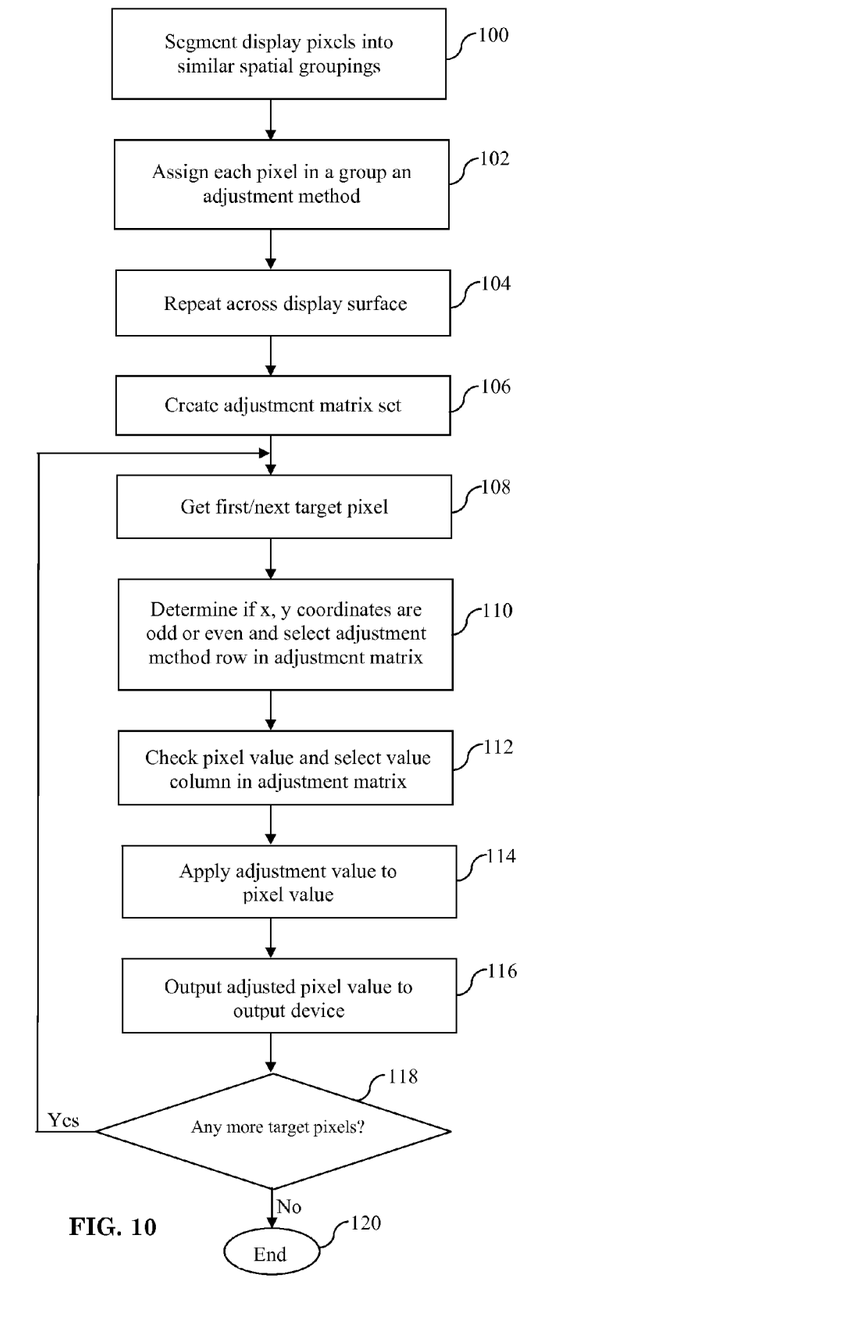
FIG. 10 is a flowchart of the spatial smoothing process of the present invention.
Figure 11:
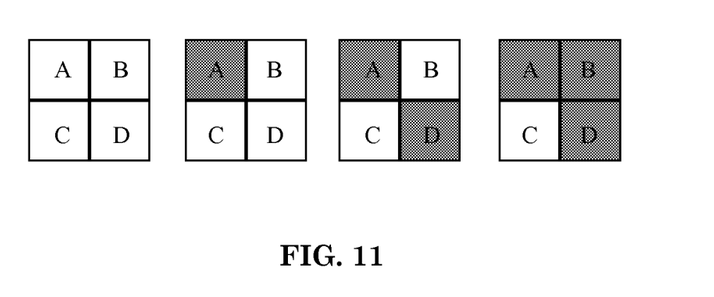
FIG. 11 illustrates the adjustment method and spatial relationship.

FIG. 10 is a flowchart that illustrates the general process of the spatial smoothing module of the present invention. The process begins by segmenting display pixels into similar spatial groups of four in a square arrangement (step 100). Each pixel in the group is assigned an adjustment method as indicated in FIG. 11 by A, B, C and D notation (step 102). Each adjustment method contains a rule for how to process pixel values at the associated display location. Display pixels that have even X and Y positions (e.g. 0,0 or 2,0) are processed according to method A. Display pixels with odd X and Y positions (e.g. 1,1 or 3,1) are processed by method D. Those with an even X and odd Y position (e.g. 0,1 or 2,1) use method C. And those with an odd X and even Y position (e.g. 1,0 or 3,0) use method B. The process repeats the spatial relationship of FIG. 11 across a display surface (step 104).

Adjustment methods may be composed of a matrix set whose element values will be used to adjust continuous channel values in a target pixel value (i.e. adjust the floating point color channel components). To produce a similar visual output as was seen in FIG. 8, an example adjustment matrix set using one embodiment is shown in FIG. 12.

Figure 12:
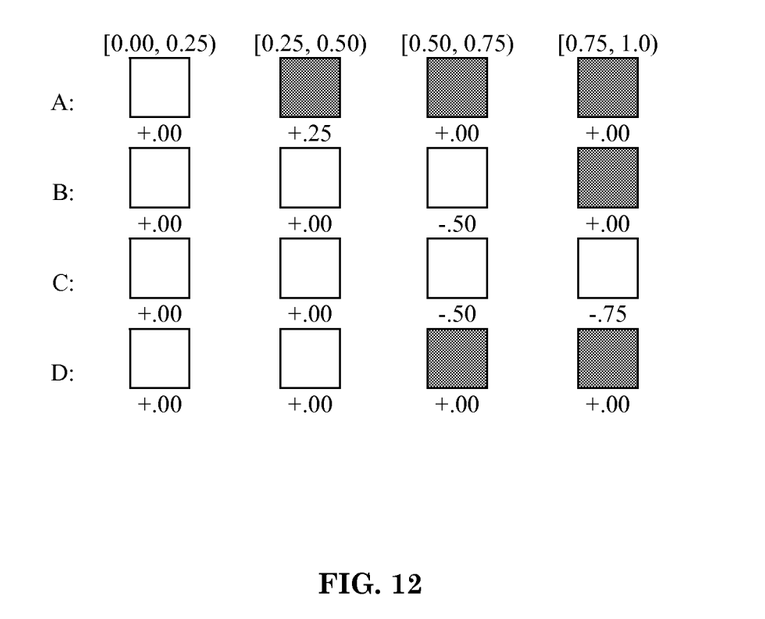
FIG. 12 shows an example adjustment matrix set.

FIG. 12 shows a matrix set with four matrices (rows) that correspond to the four adjustment methods A, B, C, and D. A row is selected (matrix A, B, C, or D) depending on the spatial position of a pixel, specifically whether its X and Y coordinate values are odd or even. The process of determining whether a pixel's X and Y coordinate values are odd or even is discussed in further detail below with reference to the GetSpatialIndex function.

The four columns of the matrix set correspond to the amount a pixel value is above a discrete output device value. For example, the output device (e.g. projector) would typically have discrete output values of 0, 1, 2 ... 256. So, a target pixel value of 128.25 would be 0.25 above the discrete output value of 128. The four columns divide the range of values above a discrete output value into 0.00 up to but less than 0.25, 0.25 up to but less than 0.50, 0.50 up to but less than 0.75, and 0.75 up to but less than 1.0.

In an alternate embodiment of the matrix set, the columns correspond to the four adjustment methods A, B, C, and D, and the rows correspond to the amount a pixel value is above a discrete output device value.

So, an entry in the adjustment matrix set is selected according to a target pixel's value 50 (FIG. 3) and its X and Y position 54 (FIG. 3). Referring to the general flow chart of FIG. 10 and the block diagram of FIG. 3, an adjustment matrix set 56 is created in step 106. Adjustment matrix set 56 as described above with adjustment method forming the rows and pixel value ranges forming the columns. Adjustment values selected as entries in this exemplary matrix set shown in FIG. 12 are based on the quantization methods of FIG. 7 and an understanding of quantization rounding of output target pixel values.

More than one adjustment matrix sets 56 can be created. For example, one matrix set can be created for the overlap region 16 (FIG. 1) of the projected image and a second matrix set can be created for the non-overlap regions 14A and 14B. In FIG. 3, the adjustment matrix set 56 is shown in one embodiment stored outside of GPU 29, in for example, main memory 30 of processing unit 18. GPU 29 then accesses the one or more adjustment matrix sets 56 during the adjustment process. Region detector 58 selects a particular adjustment matrix set 56 when one adjustment matrix set 56 is applied to one region only (i.e. the overlap region).

Step 108 gets the first target pixel from pixel/fragment shader 44. Then, in step 110, method selector 60 uses X,Y position 54 to determine which matrix A, B, C, or D to select. In step 112, the target pixel value 50 is checked to determine which column in the selected matrix should be accessed. The channel adjustor 62 then adjusts the pixel value (step 114) by selecting the matrix entry identified by the method selector 60 and target pixel value 50. This typically will be performed for each of the red, green, and blue channels.

The adjusted output pixel value 64 will then be output to the particular projector 12 (N) in step 116. The process then checks to see if there are any more target pixels (step 118). If so, the process loops back to step 108 to get the next pixel. If not, the process ends (step 120).

As mentioned above, adjustment values selected as entries in this exemplary matrix set shown in FIG. 12 are based on the quantization methods of FIG. 7 and an understanding of quantization rounding of output target pixel values. The adjustment values are either zero or a fraction of a unit of the discrete output device value. In the example of FIG. 12, the unit of the discrete output device value is 1 and the fractions of the unit are 0.25, 0.50, and 0.75. The adjustment values are zero or positive or negative fractions. Referring to matrix A (row 0 in this set), this matrix is associated with an adjustment method A that operates on pixels at even X and Y display positions (i.e. the upper left pixel in a display pixel group). For the pixel location A in a pixel group, matrix A is configured to adjust pixel channel values that are more than 25% above a discrete output device value. Such values shall be adjusted upward to the next discrete output device value. Each matrix column provides a different adjustment value according to the percentage range above a discrete output device value indicated by each channel in a target pixel value. Note, for example, how no adjustment is added for values above 50% in method A and method D since known GPU quantization rounding of output pixel values will automatically handle the job.

Each adjustment matrix provides different adjustment values for the respective pixels location within the pixel group. Note that matrix usage models the effects of FIG. 8 when all pixels in a pixel group have the same target pixel value within a range other than discrete bit depth values. Since a shader will operate on one target pixel value (one display location), results are established through multiple shader operations through rasterization of all display pixels. The adjustment matrix set shown also assumes a conversion to device values from the normalized ranges, and will be understood by examination of the pixel shader code. For example, a target pixel channel value in pixel position A has a normalized value of exactly 128.25/255. If output directly from the pixel/fragment shader 44, quantization rounding would cause the discrete output value 128 to be sent to the display. However, according to adjustment method A, this value requires adjustment to the next discrete output value. This is accomplished by adding 0.25 (per matrix A) which achieves a modification value of exactly (128.25+0.25)/255 or 128.50/255. Since rounding is known to occur with output quantization, the actual discrete value 129 would be output to the display.

One example OpenGL implementation for a Fragment Shader with the process of the present invention is shown in FIG. 13. An integer pixel width and height of the display 40 (displayPixelWidth and displayPixelHeight), FIG. 3, is a globally provided configuration parameter of the shader (as each projection device may differ in resolution).

The GetSpatialIndex function, performed for example by method selector 60, receives an argument containing the fragment pixel coordinate in the display as a normalized position (i.e. X,Y between 0.0 and 1.0) with usual texel offset of ½ a rasterization unit. The first operation of this function is to scale the normalized position back to device coordinates as floating point values, pixelPosX and pixelPosY. To combat limited GPU precision errors, it may be necessary to add some small amount, like 0.1, to these values prior to continued calculations. These coordinates are next divided in half and the fractional result of the division is stored into X and Y as positive values. The values X and Y can now be used to detect if a device coordinate is odd or even in the respective axis. In another approach, testing for odd or even can include inspection of a least significant bit of an integer value. However, bit field testing capabilities are typically unavailable in a shader language. Lastly, a computation using these values will produce an integer output of 0, 1, 2, or 3 to designate a row index denoting a specific A, B, C, or D adjustment matrix. The device coordinate is thus used to determine an adjustment matrix index that will be used, according to a spatial relationship.

The AdjustValue function, performed for example by channel adjustor 62, receives an argument containing an adjustment matrix set ABCD, a row index for selecting a particular adjustment matrix from the ABCD matrix set, and a normalized floating point color value to be adjusted. The function first computes a column index into the adjustment matrix according to the input color value. This is achieved by scaling the value back into the target bit-depth range (0-255 for 8-bit channel) but as a floating point result. Any fractional component from the conversion indicates the difference from a device capable output and may be subject to quantization error. Therefore, this fractional portion is converted into a column index for an adjustment matrix. The adjustment matrix is chosen by the row index, and the column index selects the adjustment matrix value which is added to the passed input color value. The resulting color value has now been adjusted according to an adjustment matrix value chosen by a spatial relationship and an input value.

The SpatialPixelAdjust function receives an argument containing an adjustment matrix set ARCD, a fragment pixel coordinate in the display as a normalized position, and an RGB color pixel with normalized floating point channel components. This function simple gathers the adjustment matrix index using the GetSpatialIndex function and adjusts each channel in the RGB color pixel using the AdjustValue function.

Functions GetAdjustForQRound and GetAdjustForQTrunc simply call the SpatialPixelAdjust function with different adjustment matrix sets. These functions show how a shader can be enabled to adjust pixels according to different known output quantization methods. The adjustment values for each matrix are different to counteract the different quantization techniques for rounding or truncation while achieving the same visual output results.

Figure 14:
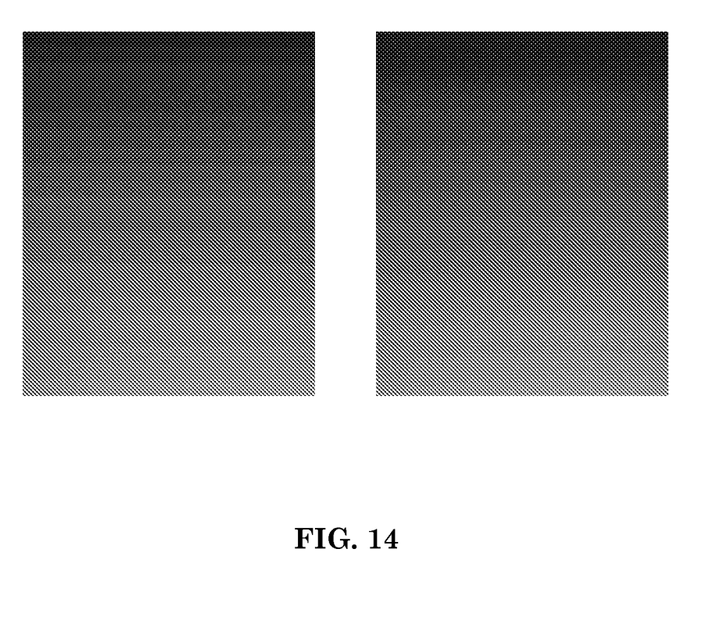
FIG. 14 shows and example of a channel gradient before (left) and after (right) the spatial smoothing of the present invention.

The result of spatially smoothing pixel values can be seen in FIG. 14. A continuous range of values for a green channel was computed in a shader according to a vertical pixel distance from the top of the image. This produces a gradient result. The left image shows values directly emitted by the pixel/fragment shader 44. Banding effects are caused due to output quantization of the pixel values being sent to the display device. The right image reveals how small adjustments to the values, with the spatial smoothing process of the present invention, effectively reduce such effects. The solution essentially "pre-quantizes" the emitted values such that output quantization to the device has a more deterministic error outcome and more visually pleasing result.

In one embodiment, spatial smoothing process is enabled only for pixel values whose luminance is within a particular range, instead of applying it to all pixel values. This is useful to control a performance characteristic for the shader or minimize added processing necessary for the spatial smoothing process. Since the sensitivity of the eye decreases as the magnitude of light increases, subtle relative differences in some pixel values, as exploited by the spatial smoothing process, may not be equally perceivable at all luminance levels (though the human eye is sensitive to relative luminance differences.) This is true for gamma adjustment too as higher luminance values are typically more compressed while low luminance values are expanded.

In another embodiment, the spatial smoothing process is enabled to operate on each pixel's color channel independently and selectively. This provides flexibility to adjust only those pixel components whose luminance is within a particular range. This allows, for example, the more perceptible green color channel to be affected differently than other pixel components.

In one embodiment, the spatial adjustment matrix is dynamically selectable. Determination of the matrix to use may be made by a user selection, a known quantization configuration, or in response to a media output characteristic. In this way, use of and operation of the function can be independently controlled.

In another embodiment, the spatial smoothing process is only applied to particular display regions. For example, the spatial smoothing process operates only among pixels located within a blending region.

In another embodiment, the spatial smoothing process is applied other than at the end of a shader program. It may instead be applied only after certain processing steps. For example, it could be applied after a black level compensation operation, but not after a color correction operation.

As described above, in the multi-projector system two projectors overlap to form a display. Even when the projectors output all black, the lowest pixel value, some light is emitted to the display screen. This light leakage is called the black level. It may be especially noticeable in the overlapping regions as the light from both projectors combines and is brighter than the two non-overlapping regions. Increasing the luminance of the pixels in these non-overlap regions to more closely approximate the overlapping region is required to achieve better display quality. Using the spatial smoothing process of the present invention, a greater range of black point compensation values can be visually realized and used to adjust the non-overlapping regions. Modifications to the black point setting user interface to select such values can be made accordingly.

The present invention may be embodied on a tangible computer-readable medium having instructions that, when executed by a computer or processing unit(s), perform the method(s) of the present invention. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographics devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for adjusting pixels of a source image prior to being output to a display device comprising:
    segmenting the pixels of the source image into spatial groups;
    assigning one of a plurality of adjustment methods to each pixel in a group;
    creating an adjustment matrix set with one of rows or columns corresponding to the plurality of adjustment methods, and the other of rows or columns corresponding to a range of pixel values that exceed a discrete output device value, and adjustment values as entries;
    receiving a pixel of the source image in a graphics processing unit (GPU) and using the GPU to:
    determine if X,Y coordinates of the pixel are even or odd to determine the pixel's relative location in its spatial group and its corresponding adjustment method;
    check a value of the pixel to determine the range of pixel values that the value of the pixel exceeds a discrete output device value:
    select an adjustment value from the adjustment matrix set corresponding to the determined adjustment method and the determined range of pixel values; and
    adjust the value of the pixel by the adjustment value to obtain an adjusted pixel value.

2. The method as in claim 1 wherein each of the spatial groups comprise four pixels.

3. The method as in claim 2 wherein the plurality of adjustment methods comprise four different adjustment methods.

4. The method as in claim 1 further comprising determining a particular region of the source image and adjusting the value of pixels only in the determined region.

5. The method as in claim 4 further comprising determining a plurality of particular regions of the source image, creating a plurality of adjustment matrices, associating each one of the plurality of adjustment matrices with a corresponding one of the plurality of particular regions, and adjusting pixels in each one of the plurality of particular regions in accordance with the corresponding one of the plurality of adjustment matrices.

6. The method as in claim 1 wherein each of the adjustment values is zero or a fraction of a unit of the discrete output device value.

7. The method as in claim 6 wherein at least one adjustment value is a positive value and at least one adjustment value is a negative value.

8. A device for adjusting pixels of a source image prior to being output to a display device comprising:
    a processing unit that:
        segments the pixels of the source image into spatial groups;
        assigns one of a plurality of adjustment methods to each pixel in a group;
        creates an adjustment matrix set with one of rows or columns corresponding to the plurality of adjustment methods, and the other of rows or columns corresponding to a range of pixel values that exceed a discrete output device value, and adjustment values as entries;
    a memory that stores the adjustment matrix set; and
    a graphics processing unit (GPU) that receives a pixel of the source image and:
        determines if X,Y coordinates of the pixel are even or odd to determine the pixel's relative location in its spatial group and its corresponding adjustment method;
        checks a value of the pixel to determine the range of pixel values that the value of the pixel exceeds a discrete output device value:
        selects an adjustment value from the adjustment matrix set corresponding to the determined adjustment method and the determined range of pixel values; and
        adjusts the value of the pixel by the adjustment value to obtain an adjusted pixel value.

9. The device as in claim 8 wherein each of the spatial groups comprise four pixels.

10. The device as in claim 9 wherein the plurality of adjustment methods comprise four different adjustment methods.

11. The device as in claim 8 wherein the GPU further determines a particular region of the source image and adjusts the value of pixels only in the determined region.

12. The device as in claim 11 wherein the GPU further determines a plurality of particular regions of the source image, and the processor creates a plurality of adjustment matrices and associates each one of the plurality of adjustment matrices with a corresponding one of the plurality of particular regions, and the GPU adjusts pixels in each one of the plurality of particular regions in accordance with the corresponding one of the plurality of adjustment matrices.

13. The device as in claim 8 wherein each of the adjustment values is zero or a fraction of a unit of the discrete output device value.

14. The device as in claim 8 wherein at least one adjustment value is a positive value and at least one adjustment value is a negative value.

15. A tangible computer-readable medium embodying instructions executable by a computer to perform a method of adjusting pixels of a source image prior to being output to a display device, the method comprising:
    segmenting the pixels of the source image into spatial groups;
    assigning one of a plurality of adjustment methods to each pixel in a group;
    creating an adjustment matrix set with one of rows or columns corresponding to the plurality of adjustment methods, and the other of rows or columns corresponding to a range of pixel values that exceed a discrete output device value, and adjustment values as entries;
    receiving a pixel of the source image in a graphics processing unit (GPU) and using the GPU to:
    determine if X,Y coordinates of the pixel are even or odd to determine the pixel's relative location in its spatial group and its corresponding adjustment method;
    check a value of the pixel to determine the range of pixel values that the value of the pixel exceeds a discrete output device value:
    select an adjustment value from the adjustment matrix set corresponding to the determined adjustment method and the determined range of pixel values; and
    adjust the value of the pixel by the adjustment value to obtain an adjusted pixel value.

16. The computer-readable medium of claim 15 wherein each of the spatial groups comprise four pixels.

17. The computer-readable medium of claim 16 wherein the plurality of adjustment methods comprise four different adjustment methods.

18. The computer-readable medium of claim 15 further comprising determining a particular region of the source image and adjusting the value of pixels only in the determined region.

19. The computer-readable medium of claim 18 further comprising determining a plurality of particular regions of the source image, creating a plurality of adjustment matrices, associating each one of the plurality of adjustment matrices with a corresponding one of the plurality of particular regions, and adjusting pixels in each one of the plurality of particular regions in accordance with the corresponding one of the plurality of adjustment matrices.

20. The computer-readable medium of claim 15 wherein each of the adjustment values is zero or a fraction of a unit of the discrete output device value.

\* \* \* \* \*